US010640202B2

(12) United States Patent
Vatovec et al.

(10) Patent No.: US 10,640,202 B2
(45) Date of Patent: May 5, 2020

(54) SHOCK ABSORBER ASSEMBLY

(71) Applicant: Safran Landing Systems UK Ltd, Gloucester, Gloucestershire (GB)

(72) Inventors: Andraz Vatovec, Gloucester (GB); Robert Kyle Schmidt, Gloucester (GB)

(73) Assignee: Safran Landing Systems UK LTD, Gloucestershire (GB)

( * ) Notice: Subject to any disclaimer, the term of this patent is extended or adjusted under 35 U.S.C. 154(b) by 187 days.

(21) Appl. No.: 14/597,818

(22) Filed: Jan. 15, 2015

(65) Prior Publication Data

US 2015/0203195 A1 Jul. 23, 2015

(30) Foreign Application Priority Data

Jan. 21, 2014 (EP) ..................................... 14151987

(51) Int. Cl.
*B64C 25/58* (2006.01)
*B64C 25/34* (2006.01)
*B60G 5/00* (2006.01)
*F16F 9/28* (2006.01)
*F16F 9/32* (2006.01)
(Continued)

(52) U.S. Cl.
CPC ................ *B64C 25/58* (2013.01); *B60G 3/01* (2013.01); *B60G 5/005* (2013.01); *B64C 25/34* (2013.01); *F16F 9/28* (2013.01); *F16F 9/3221* (2013.01); *F16F 9/3235* (2013.01); *F16F 9/54* (2013.01); *B60G 2204/4232* (2013.01); *B60G 2204/8304* (2013.01); *B60G 2300/16* (2013.01);
(Continued)

(58) Field of Classification Search
CPC .. B64C 25/58; B64C 25/34; F16F 9/54; F16F 9/28; B60G 2204/8304

USPC ..................................................... 244/102 A
See application file for complete search history.

(56) References Cited

U.S. PATENT DOCUMENTS 1,847,491 A  3/1932  Messier
1,852,230 A  4/1932  Breguet
(Continued)

FOREIGN PATENT DOCUMENTS

CN  2888178 Y  4/2007
DE  2054554      5/1971
(Continued)

OTHER PUBLICATIONS

Partial European Search Report for European Application No. 14151987.6-1755 dated Aug. 14, 2014.
(Continued)

*Primary Examiner* — Brian M O'Hara
*Assistant Examiner* — Keith L Dixon
(74) *Attorney, Agent, or Firm* — RatnerPrestia

(57) ABSTRACT

A shock absorber assembly having a wheel assembly including first and second coupling points, and first and second shock absorber elements. Each shock absorber element includes a housing portion defining a bore, and a rod slidably coupled within the bore such that the shock absorber element has a variable length. Each rod is coupled to a respective coupling point of the wheel assembly. The shock absorber assembly is arranged to maintain the relative positions of the first and second housing portions such that the longitudinal axis of the first bore has a generally fixed relationship with respect to the longitudinal axis of the second bore.

3 Claims, 7 Drawing Sheets

(51) Int. Cl.
*B60G 3/01* (2006.01)
*F16F 9/54* (2006.01)
*B64C 25/00* (2006.01)

(52) U.S. Cl.
CPC .... *B60G 2500/30* (2013.01); *B64C 2025/008* (2013.01); *F16F 2234/00* (2013.01)

(56) References Cited

U.S. PATENT DOCUMENTS

| | | | |
|---|---|---|---|
| 2,218,370 A | 10/1940 | Hojnowski | |
| 2,690,887 A * | 10/1954 | Perdue | B64C 25/34 244/102 R |
| 2,953,395 A | 9/1960 | Turner | |
| 2,960,289 A | 11/1960 | Westcott | |
| 3,057,586 A | 10/1962 | Hornsby | |
| 3,533,581 A * | 10/1970 | Leclercq | B64C 25/12 244/104 R |
| 3,826,450 A * | 7/1974 | Currey | B64C 25/001 244/100 R |
| 4,597,548 A * | 7/1986 | Bergloff | B64C 25/60 188/297 |
| 4,720,063 A * | 1/1988 | James | B64C 25/14 244/102 R |
| 5,100,083 A * | 3/1992 | Large | B64C 25/34 244/102 R |
| 5,320,374 A | 6/1994 | Farris et al. | |
| 5,944,283 A | 8/1999 | Carter | |
| 6,120,009 A * | 9/2000 | Gatehouse | B64C 25/60 267/64.11 |
| 6,173,920 B1 * | 1/2001 | Meneghetti | B64C 25/34 244/100 R |
| 6,651,931 B1 * | 11/2003 | Fox | B64C 25/12 244/104 R |
| 7,320,387 B2 * | 1/2008 | Sendrea | B60G 17/08 188/285 |
| 8,565,968 B2 * | 10/2013 | Nance | G01M 17/04 244/100 R |
| 8,668,164 B2 * | 3/2014 | Seror Goguet | B64C 7/00 244/1 N |
| 8,727,274 B2 * | 5/2014 | Sorin | B64C 25/405 244/104 FP |
| 8,840,063 B2 * | 9/2014 | Lieven | B64C 25/20 244/102 A |
| 2011/0266388 A1 | 11/2011 | Sorin | |
| 2011/0309193 A1 | 12/2011 | Seror Goguet | |
| 2013/0068884 A1 | 3/2013 | Ducos | |

FOREIGN PATENT DOCUMENTS

| | | |
|---|---|---|
| DE | 4412874 A1 | 6/1995 |
| EP | 0631929 | 1/1995 |
| EP | 0635426 | 1/1995 |
| FR | 2812613 | 2/2002 |
| GB | 518414 | 2/1940 |
| GB | 543609 | 3/1942 |
| GB | 578414 | 6/1946 |
| GB | 643636 | 9/1950 |
| GB | 745965 | 3/1956 |
| GB | 1227424 | 4/1971 |
| RU | 2090449 C1 | 9/1997 |
| RU | 2245822 C2 | 2/2005 |
| RU | 2247678 | 3/2005 |

OTHER PUBLICATIONS

Photograph of Vickers-Armstrongs, Ltd. "Valiant" aircraft right main landing gear. Date of photograph unknown, but admitted as prior art.
Russian Decision on Granting Patent for Russian Application No. 2015/100660/11, dated Feb. 14, 2019 with translation, 12 pages.
Third Chinese Office Action for Chinese Application No. 201510026445.1, dated Mar. 5, 2019 with translation, 12 pages.
Fifth Chinese Office Action for Chinese Application No. 201510026445.1, dated Dec. 18, 2019 with translation, 7 pages.

* cited by examiner

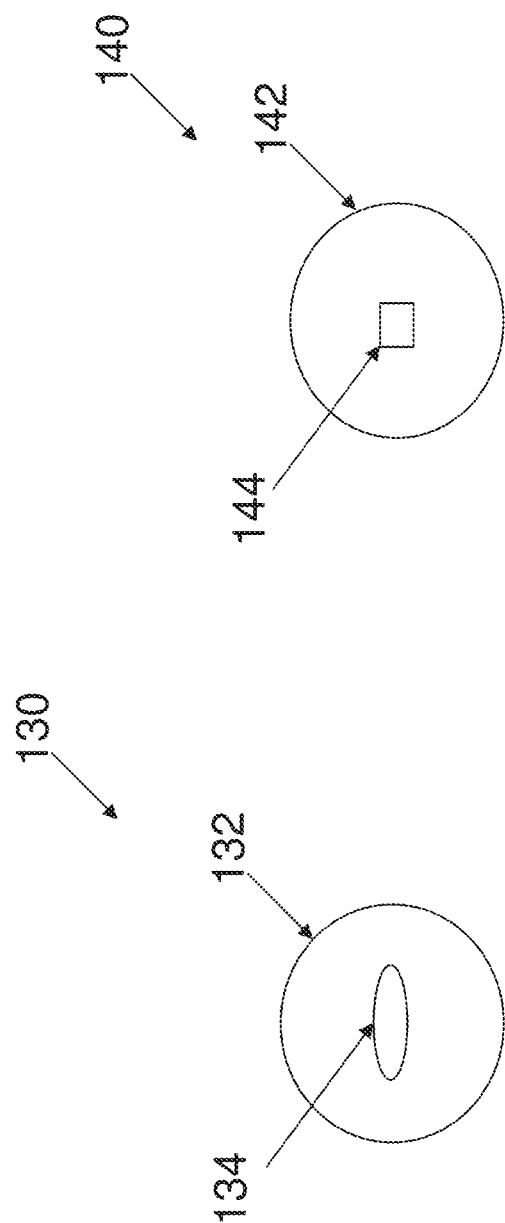

SHOCK ABSORBER ASSEMBLY

This application claims the benefit of European Application No. EP 14151987.6, filed Jan. 21, 2014, the entire disclosure of which is incorporated herein by reference.

TECHNICAL FIELD

The present invention relates to a shock absorber assembly arranged to be coupled to a vehicle.

BACKGROUND TO THE INVENTION

Current shock absorber assemblies generally comprise a cylinder and a sliding rod in a telescopic configuration. Additional external elements are provided to mechanically connect the cylinder to the sliding rod in order to inhibit rotation of the rod relative to the cylinder; for example, in the context of aircraft landing gear, a torque link.

The present inventors have realised that known shock absorber assemblies can be improved in terms of one or more of: simplicity; weight; strength/robustness; aerodynamic performance and aeroacoustic performance.

SUMMARY OF INVENTION

According to a first aspect of the present invention there is provided a shock absorber assembly arranged to be coupled to a vehicle, the shock absorber assembly comprising:
- a wheel assembly including a first coupling point and a second coupling point;
- a first shock absorber element, the first shock absorber element comprising:
  - a first housing portion defining a first bore; and
  - a first rod, slidably coupled within the first bore such that the length of the first shock absorber element can be varied, the first rod being coupled to the first coupling point of the wheel assembly; and
- a second shock absorber element comprising:
  - a second housing portion defining a second bore; and
  - a second rod, slidably coupled within the second bore such that the length of the second shock absorber element can be varied, the second rod being coupled to the second coupling point of the wheel assembly, wherein the shock absorber assembly is arranged to maintain the position of the first housing portion relative to the position of the second housing portion such that the longitudinal axis of the first bore has a generally fixed relationship with respect to the longitudinal axis of the second bore.

Thus, the shock absorber assembly according to the first aspect is arranged to inhibit unwanted rotation of the wheel assembly; a torsion force acting on one of the shock absorber elements is reacted by the other shock absorber element.

According to a second aspect of the present invention there is provided a shock absorber assembly arranged to be coupled to a vehicle, the shock absorber assembly comprising:
- a shock absorber element comprising:
  - a housing portion defining a linear bore having a non-circular cross section; and
  - an elongate rod slidably coupled within the bore to permit axial movement of the rod, the rod having a non-circular profile arranged to engage with the bore to inhibit rotation of the rod relative to the housing Thus, the shock absorber assembly according to the second aspect is arranged to inhibit unwanted rotation of the wheel assembly; a torsion force acting on the rod is reacted by the non-circular side wall profile of the rod. The shock absorber assembly according to the second aspect therefore provides an alternative solution to the technical problem of inhibiting rotation of the rod in comparison to that of the first aspect.

The first and second rods are slidably coupled within the first and second bores so that the length of the shock absorber elements may be varied by varying the position of the rods along the longitudinal axes of the bores. The length of each of the first and second shock absorber elements may each be independently variable.

The shock absorber assembly may comprise three or more shock absorber elements, each shock absorber element having a respective housing portion and a rod coupled to a respective coupling point the wheel assembly.

A plurality of the shock absorber elements may have different shock absorbing properties resulting in, for example, different spring curves and/or levels of damping. This may be achieved by different shock absorber designs.

The first housing portion and the first rod may together define a first chamber for containing a first fluid.

The first fluid may comprise any fluid suitable for use in a shock absorber and may be liquid or gas or a combination thereof. For example, the first fluid may comprise oil or gas or a combination of the two.

In some embodiments the second housing portion and the second rod may together define a second chamber for containing a second fluid.

The second fluid may comprise any fluid suitable for use in a shock absorber and may be liquid or gas or a combination thereof; for example, the second fluid may be oil or gas or a combination of the two.

Thus, in some embodiments, the different shock absorbing properties of the first and second shock absorber may be achieved by providing different amounts of fluid in the shock absorber. Additionally or alternatively, different types of shock absorbing fluid could be provided in the first and second chambers to cause the first and second shock absorber elements to have different shock absorbing properties.

An advantage of providing first and second shock absorber elements which have different shock absorbing properties from each other is that a two-stage shock absorption function may be achieved. If more than two shock absorber elements are used, a multi-stage or quasi continuously variable shock absorption function may be achieved. Thus the overall shock absorbing properties of the shock absorber assembly may vary depending on the force applied to the shock absorber assembly.

Each of the first and second rods may be coupled to the wheel assembly via a lug or other suitable coupling means.

The length of the first shock absorber element may be different from the length of the second shock absorber element when the shock absorber assembly is in a first condition.

For example, the vehicle may be an aircraft and the first condition may be when the aircraft is in the air, with no ground loads acting on the shock absorber assembly. The first and second shock absorber elements may automatically assume different lengths when the aircraft is in the air. A second condition may be when the aircraft is on the ground, in which case the ground loads acting on the shock absorber assembly may automatically cause the shock absorber elements to assume the same length. Thus, the wheel assembly may be caused to assume a first angular orientation relative to the first housing portion when the aircraft is in the air, and a different angular orientation with respect thereto when the aircraft is on the ground, without the need for additional external elements such as a pitch trimmer.

The wheel assembly may include a bogie beam, pivotally coupled to the first and second rods.

The first and second housing portions may be defined by a unitary housing; for example, in some embodiments, the first and second bores may be defined by a single cylinder such as a main fitting of an aircraft landing gear. An advantage of defining the first and second housing portions by a unitary housing is that this may improve the aerodynamic and aeroacoustic properties of the shock absorber assembly over known systems which include external torque links or the like.

One or more of the shock absorber elements may be in fluid communication with a reservoir containing the first and/or second fluid, the shock absorber assembly further comprising a control system operable to control fluid transfer between the one or more shock absorber elements and the reservoir such that the length of the one or more shock absorber elements may be controlled by controlling the amount of fluid in the chambers thereof.

Thus the length of at least one of the shock absorber elements may be actively controlled. This gives rise to an advantage that the orientation of the wheel assembly can be controlled and changed between two or more different orientations by changing the amount of fluid in one or more of the shock absorber elements.

In some embodiments, only the first shock absorber element may be connected to a reservoir. In this case, the length of the first shock absorber element can be controlled and the orientation of the wheel assembly may be controlled by controlling the length of the first shock absorber element to change the relative lengths of the first and second shock absorber elements.

Alternatively, both the first and second shock absorber elements may be connected to a reservoir, enabling the length of both of the shock absorber elements to be controlled by controlling the amount of fluid present in the chambers of the shock absorber elements at any given time. The first and second shock absorber elements may be in fluid communication with a single reservoir or the first and second shock absorber elements may each be in fluid communication with a separate reservoir. The lengths of the first and second shock absorber elements may be changed relative to each other, in order to change the orientation of the wheel assembly. Additionally or alternatively, the lengths of the first and second shock absorber elements may be increased or decreased together in order to alter the distance between the wheel assembly and the vehicle.

Additionally or alternatively, the first and second shock absorber elements may be in fluid communication with each other and the shock absorber assembly may further comprise a control system operable to control fluid transfer between the shock absorber elements such that the relative lengths of the shock absorber elements may be controlled by controlling the amount of fluid exchanged between the chambers thereof. In some embodiments comprising more than two shock absorber elements, more than two of the shock absorber elements may be in fluid communication with each other.

An advantage associated with using the shock absorber elements to control the orientation of the wheel assembly is that an external element such as a pitch trimmer may not be required. Moreover, the shock absorber elements may be able to apply a greater force to the wheel assembly than alternative systems for controlling the orientation of a wheel assembly such as a pitch trimmer. Thus, the orientation of the wheel assembly may be controlled even when the wheel assembly is experiencing large loads, such as from the weight of the vehicle, which in the context of aircraft may be in excess of 30 tonnes.

An advantage associated with using the shock absorber elements to alter the distance between the wheel assembly and the vehicle is that the ride height of the vehicle may be increased or decreased as required. For example, in some embodiments in which the vehicle is an aircraft, the ride height of the aircraft may be increased during landing or take-off when the tail of the aircraft is at risk of hitting the ground.

In some embodiments, the wheel assembly may include two or more wheels and the control system may be operable to lift at least one of the wheels off the ground when the vehicle is on the ground.

In some embodiments, the wheel assembly may include two or more sets of wheels, each set coupled to an axle, and the control system may be operable to lift at least one of the sets of wheels off the ground when the vehicle is on the ground.

The control system being operable to lift at least one of the wheels or one set of wheels off the ground gives rise to increased manoeuvrability of the vehicle. For example, manoeuvrability of a vehicle such as an aircraft may be increased by lifting an axle of the wheel assembly off the ground to enable the vehicle to make tighter turns. This is particularly advantageous when the wheel assembly does not have a steering mechanism as in this case the forces exerted on the wheel assembly are reduced which may prevent twisting of the shock absorber assembly.

According to a third aspect of the invention, there is provided an aircraft landing gear comprising a shock absorber assembly in accordance with the first or second aspects of the invention.

BRIEF DESCRIPTION OF THE DRAWINGS

Embodiments of the invention will now be described, strictly by way of example only, with reference to the accompanying drawings, in which:

FIGS. 7a and 7b are a schematic representations each showing a cross-sectional view through a housing of a shock absorber assembly according to a further embodiment of the invention.

DESCRIPTION OF THE EMBODIMENTS

Figure 1:
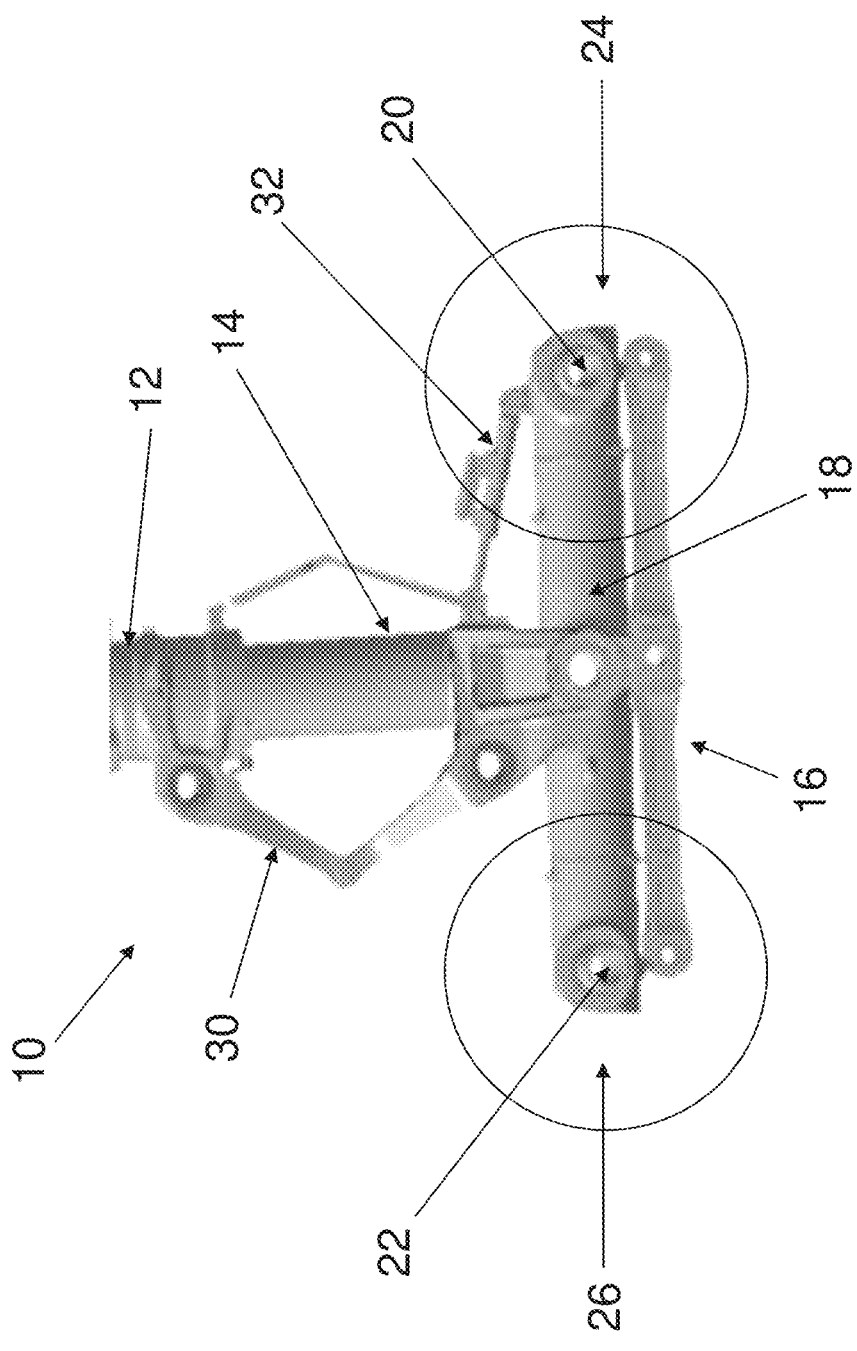
FIG. 1 is a schematic representation showing a side view of a known landing gear shock absorber assembly.

Referring first to FIG. 1, a known aircraft landing gear shock absorber assembly, is shown generally at 10. The shock absorber assembly has a cylindrical housing 12, also referred to as a main fitting of the landing gear. A first end of a cylindrical rod 14 is slidably coupled within a bore, formed within the housing 12. A second end of the rod 14 which is disposed outside of the housing 12, is coupled to a wheel assembly 16.

The wheel assembly 16 comprises a bogie beam 18 and first and second axles 20, 22 coupled to the bogie beam 18, the first and second axles 20, 22 supporting first and second sets of wheels 24, 26. Each of the first and second sets of wheels 24, 26 may consist of a single wheel or a plurality of wheels.

The housing 12 and the first rod 14 together define a chamber for containing a fluid. The fluid may be liquid such as oil, or gas such as air or nitrogen. The chamber may include both gas and liquid, for example, a oleo-pneumatic shock absorption system may be used.

A torque link 30 couples the rod 14 to the housing 12 to inhibit relative rotation between the housing 12 and the rod 14.

The aircraft landing gear includes a pitch trimmer actuator 32. The pitch trimmer actuator 32 is connected at one end to the bogie beam 16 and at the other end to the rod 14 via a mechanical linkage in a triangular configuration. The pitch trimmer actuator 32 may be a hydraulic, pneumatic or electrical actuator.

Figure 2:
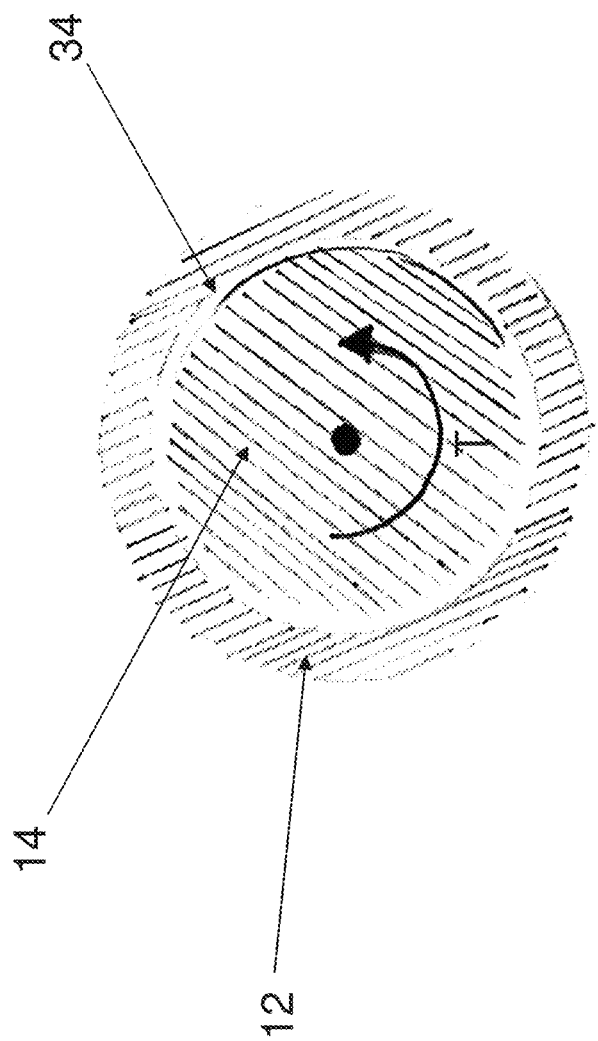
FIG. 2 is a schematic representation showing a cross-sectional view through a housing of a known shock absorber assembly.

FIG. 2 shows a cross-sectional view through the housing 12 of the shock absorber assembly 10 of FIG. 1. A single cylindrical bore 34 is formed within the housing 12.

The longitudinal axis of the bore is parallel to the longitudinal axis of the housing. A cylindrical rod 14 is slidably coupled within the bore 34.

When torsion loads are applied to the rod 14, such as the force indicated by arrow T, rotation of the rod can occur, which can lead to unwanted rotation of the wheel assembly 16. The torque link 30 inhibits rotation of the rod 14 relative to the housing 12.

Figure 3:
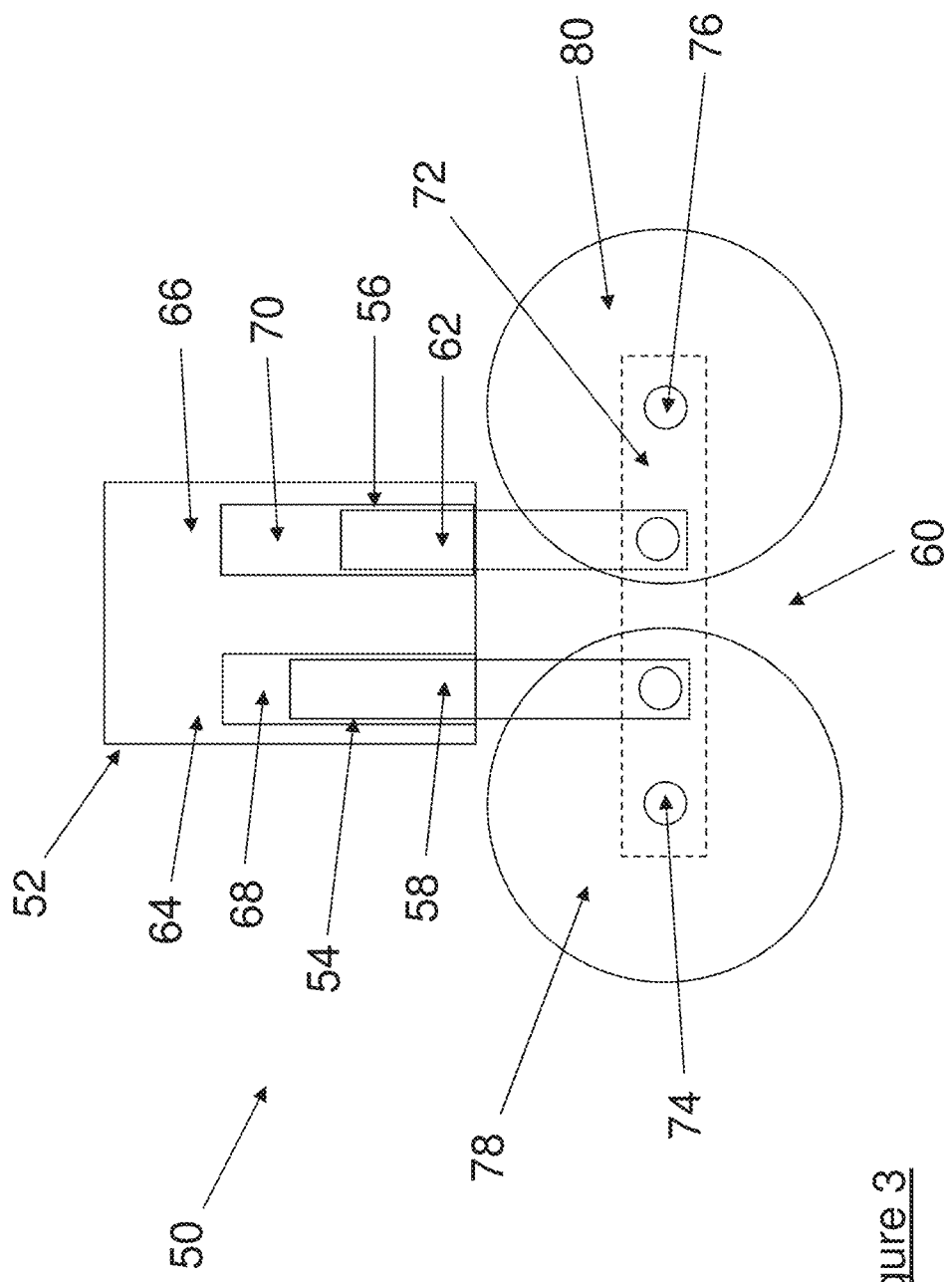
FIG. 3 is a schematic representation showing a side view of a shock absorber assembly according to an embodiment of the invention.

In FIG. 3 a shock absorber assembly according to an embodiment of the invention is shown generally at 50. The shock absorber assembly 50 comprises a cylindrical housing 52, which in some embodiments may be the main fitting of an aircraft landing gear.

Within the housing there is a first bore 54, and a second bore 56. The first and second bores 54, 56 are cylindrical in shape. The longitudinal axis of the first bore 54 is generally parallel with respect to the longitudinal axis of the second bore 56. In the embodiment shown in FIG. 3, the first and second bores have the same length and diameter. However in other embodiments the first and second bores 54, 56 may have different shapes, lengths and/or diameters.

The shock absorber assembly further comprises a first rod 58, which is cylindrical in shape, coupled within the first bore 54 at a first end. The cross-sectional dimensions of the first rod 58 and the first bore 54 are complementary such that the first rod 58 is free to slide within the first bore 54 along the longitudinal axis of the first bore 54. The travel of the first rod 58 is limited by conventional means such as a shoulder portion or other type of end stop. A second end of the first rod 58 extends out of the first bore 54. The second end of the first rod 58 is coupled to a wheel assembly 60.

The shock absorber assembly further comprises a second rod 62, which is cylindrical in shape, coupled within the second bore 56 at a first end. The cross-sectional dimensions of the second rod 62 and the second bore 56 are complementary such that the second rod 62 is free to slide within the second bore 56 along the longitudinal axis of the second bore 56. The travel of the second rod 62 is limited by conventional means such as a shoulder portion or other type of end stop. A second end of the second rod 62 extends out of the second bore 54. The second end of the second rod 62 is coupled to the wheel assembly 60.

The length of the first rod 58 is greater than the length of the second rod 62. However, in other embodiments the length of the first rod 58 may be equal to or shorter than the length of the second rod 62.

The diameter of the first rod 58 is equal to the diameter of the second rod. However in other embodiments the diameter of the first rod 58 may be different from the diameter of the second rod 62.

The housing 52 includes a first housing portion 64, within which the first bore 54 is disposed. The first portion of the housing 64, the first bore 54 and the first rod 58 collectively make up a first shock absorber element. The housing 52 also includes a second housing portion 66, within which the second bore 56 is disposed. The second housing portion 66 of the housing 52, the second bore 56 and the second rod 62 collectively make up a second shock absorber element. The first and second shock absorber elements therefore define a parallel coupling between the aircraft, on the one hand, and the wheel assembly 60, on the other hand such that the longitudinal axis of the first bore has a generally fixed relationship with respect to the longitudinal axis of the second bore.

The first housing portion 64 and the first rod 58 together define a first chamber 68 for containing a fluid. The fluid may be liquid such as oil, or gas such as air or nitrogen. The chamber 68 may include both gas and liquid, for example, an oleo-pneumatic shock absorption system may be used.

The second housing portion 66 and the second rod 62 together define a second chamber 70 for containing a fluid. The fluid may be liquid such as oil or gas such as air or nitrogen. The chamber 70 may include both gas and liquid, for example, a oleo-pneumatic shock absorption system may be used.

The wheel assembly 60 comprises a bogie beam 72 and the first and second rods 58, 62 are each pivotally coupled to the bogie beam 72 such that the first and second rods 58, 62 are aligned parallel to each other. The wheel assembly 60 further comprises first and second axles 74, 76, coupled to the bogie beam, the first and second axles 74, 76 supporting first and second sets of wheels 78, 80. Each of the first and second sets of wheels may consist of a single wheel or a plurality of wheels 78, 80.

The skilled person will appreciate that in embodiments of the invention, any suitable types of wheel assembly could be used. For example, in some embodiments, the wheel assembly may comprise a single wheel or a set of wheels, having an axle to which the first and second rods may be coupled.

Figure 4:
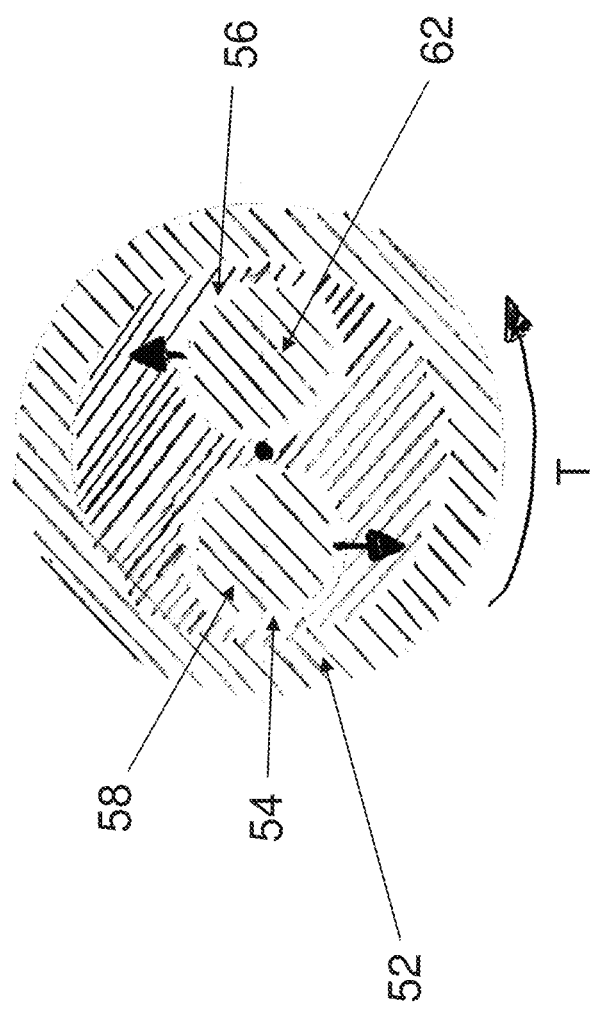
FIG. 4 is a schematic representation showing a cross-sectional view through a housing of the shock absorber assembly of FIG. 3.

FIG. 4 shows a cross-sectional view through the housing 52 of FIG. 3. It can be seen that a torsion force T acting on the first rod 58 is reacted by the second rod 62. Therefore, rotation of the wheel assembly 60 is inhibited, since the first and second rods 58, 62 are each coupled to the wheel assembly 60.

Figure 5:
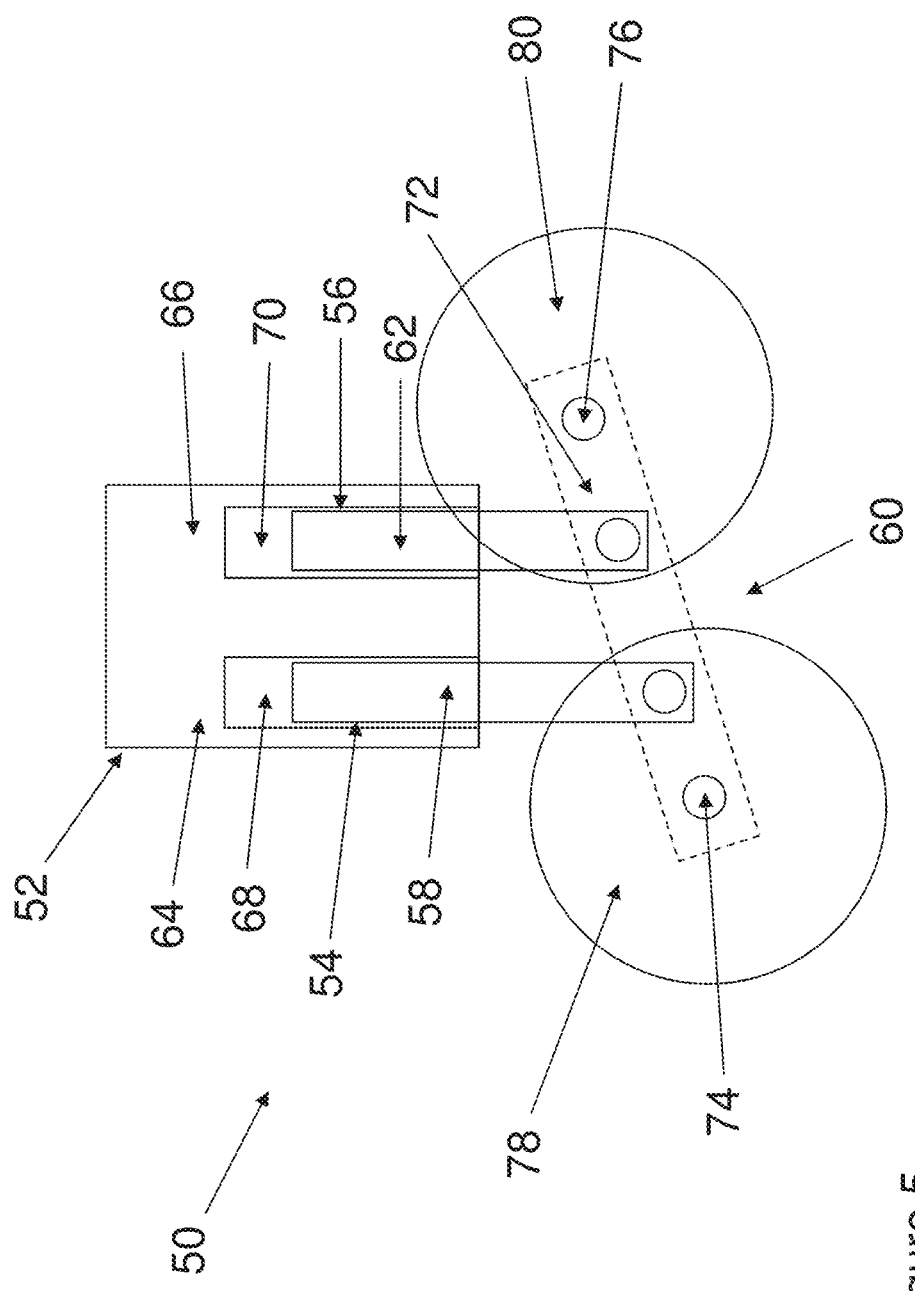
FIG. 5 is a schematic representation showing a side view of the shock absorber assembly of FIG. 3 in a first condition.

FIG. 5 shows the shock absorber assembly 50 in a first condition. In the example shown here, the first condition corresponds to the shock absorber assembly 50 bearing no load from the vehicle. The length of the first shock absorber element is different from the length of the second shock absorber element when the shock absorber assembly is in a first condition. The length of a shock absorber element may be the axial length from the second end of the rod of the shock absorber element to the end of the housing arranged to be coupled to the vehicle. In the example shown in FIG.

5, the length of the first rod 58 is greater than the length of the second rod 62. The first and second bores 54, 56 are of equal length and the first and second housing portions 64, 66 are also of equal length. Therefore the length of the first shock absorber element is greater than the length of the second shock absorber element when the shock absorber assembly is in a first condition. Thus, the bogie beam is held in a tilted orientation in which the second set of wheels 80 is closer to the housing than the first set of wheels 78.

However, in some embodiments, shock absorber elements of different lengths may be achieved by differences in other dimensions of the shock absorber such as the length of the bore, or by the first rod and the first bore having cross-sections of different diameters to the second rod and the second bore. Additionally or alternatively, the shock absorber elements may be provided with different levels or different types of shock absorbing fluid within the first and second chambers 68, 70.

Figure 6:
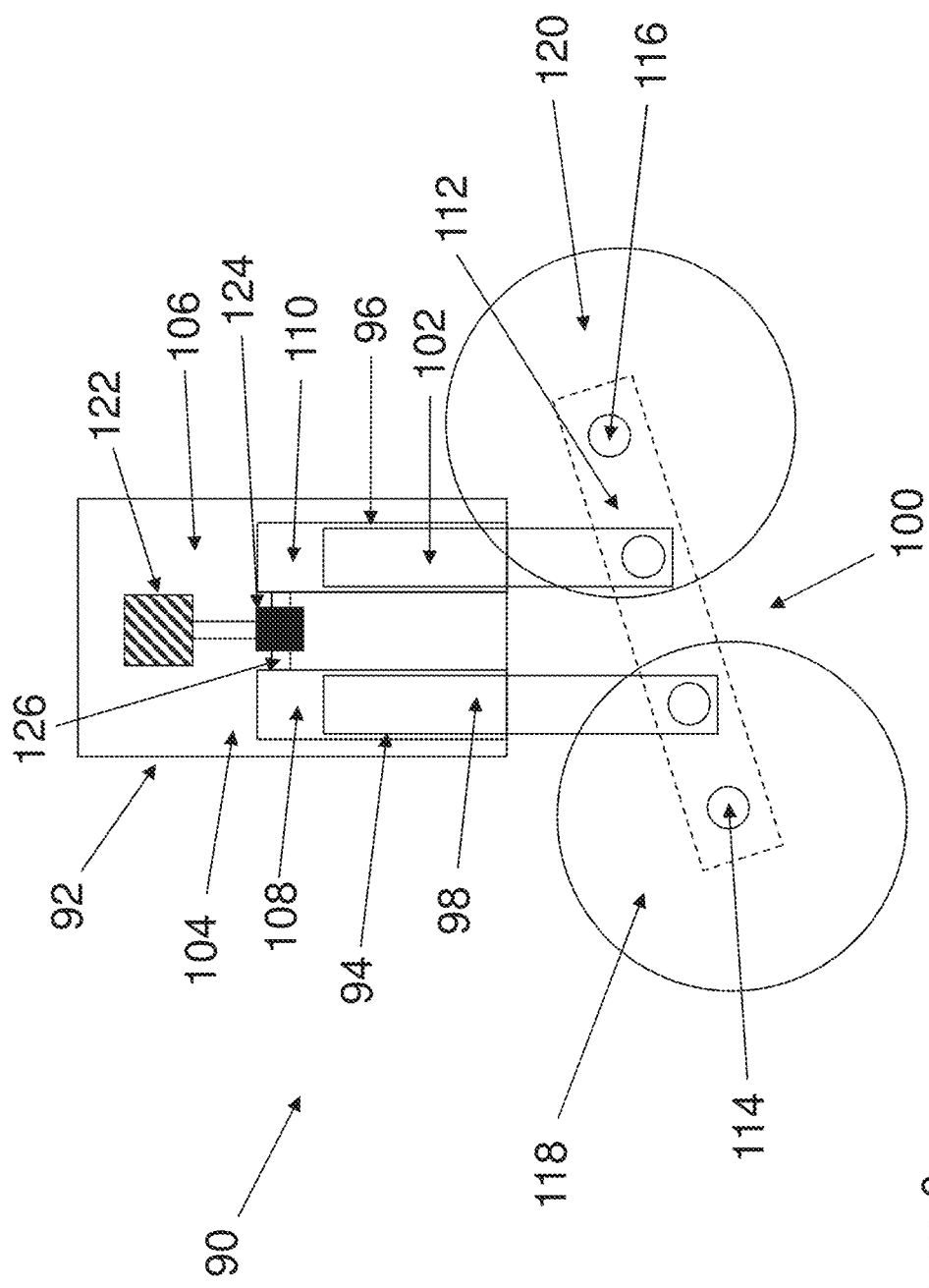
FIG. 6 is a schematic representation showing a side view of an actively controllable shock absorber assembly according to an embodiment of the invention.

FIG. 6 shows an embodiment in which the lengths of the shock absorber elements can be actively controlled in order to change the orientation of the bogie beam, thereby eliminating the need for a pitch trimmer. The shock absorber assembly 90 is shown in a first condition in which the weight of the vehicle is off the shock absorber assembly 90. Features 92 to 120 of shock absorber 90 correspond to features 52 to 80 of the shock absorber 50 shown in FIG. 5 and therefore will not be described in detail here.

Shock absorber 90 additionally includes a control unit 122 which controls a valve 124.

The valve 124 is in fluid communication with each of the first and second chambers 108, 110 via a tube 126. Thus, fluid flow between the two chambers may be controlled by the control unit 122. In embodiments of the invention, the valve 124 may be a restrictor valve arranged to provide various levels of fluid restriction through the tube 126. Many suitable valve and control unit configurations will be apparent to the skilled person and as such, for brevity, these are not described in detail.

In the example shown in FIG. 6, the total amount of fluid in the first and second chambers 108, 110 remains constant and the control system controls the proportion of the total amount of fluid present in each of the chambers at any given time. However, it will be appreciated that in other embodiments, one or more reservoirs of fluid, in fluid communication with one or both of the chambers 108, 110 may be provided. In that case, fluid may flow to one or both of the first and second chambers 108, 110 from the reservoir(s) via one or more valves controlled by one or more control units. Any suitable control system may be provided for modifying the length of one or both shock absorber elements in order to change the orientation of the bogie beam 72. An example of a control circuit for supplying fluid to a shock absorber is described in U.S. Pat. No. 6,120,009A with reference to FIG. 3.

Although embodiments of the invention have been described as having a plurality of shock absorber elements, in other embodiments of the invention the shock absorber assembly 130, 140 may, as illustrated in FIGS. 7a and 7b, consist of a single rod 134, 144 and bore each having non-circular cross sections so as to inhibit rotation of the rod within the housing 132, 142. For example, the bore and/or rod may have one of the following profiles: elliptical, rectangular or a figure of eight. Thus, the elongate rod 134, 144 may be slidably coupled within the bore to permit axial movement and may have a non-circular profile arranged to engage with the bore to inhibit rotation of the rod relative to the housing.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A shock absorber arranged to be coupled to a vehicle, the shock absorber comprising:
   a shock absorber housing defining a linear bore having a non-circular cross section; and
   an elongate shock absorber rod slidably coupled within the bore to permit axial movement of the shock absorber rod, the shock absorber rod having a non-circular profile arranged to engage with the bore to inhibit rotation of the rod relative to the housing;
   wherein the shock absorber rod is arranged to slide in the bore such that the shock absorber rod can move between an extended condition and a contracted condition relative to the shock absorber housing.

2. A shock absorber assembly according to claim 1, wherein the bore and/or shock absorber rod have an elliptical or rectangular profile.

3. The shock absorber of claim 1, further comprising a non-circular seal disposed between the housing and the shock absorber rod.

* * * * *